United States Patent [19]
Greenwood et al.

[11] Patent Number: 4,742,140
[45] Date of Patent: May 3, 1988

[54] OIL- AND WATER-REPELLENT COPOLYMERS

[75] Inventors: Edward J. Greenwood, Newark; Albert L. Lore, Wilmington; Nandakumar S. Rao, Newark, all of Del.

[73] Assignee: E. I. Du Pont de Nemours and Company, Wilmington, Del.

[21] Appl. No.: 905,307

[22] Filed: Sep. 9, 1986

Related U.S. Application Data

[63] Continuation-in-part of Ser. No. 824,355, Jan. 23, 1986, abandoned.

[51] Int. Cl.$^4$ .............................................. C08F 20/24
[52] U.S. Cl. ..................................................... 526/245
[58] Field of Search ........................................ 526/245

[56] References Cited

U.S. PATENT DOCUMENTS 4,100,340  7/1978  Waldmann ........................ 526/245
4,582,882  4/1986  Lynn ................................ 526/245

FOREIGN PATENT DOCUMENTS 1571009  7/1980  United Kingdom .

*Primary Examiner*—Paul R. Michl
*Attorney, Agent, or Firm*—Charles E. Feeny

[57] ABSTRACT

Oil- and water-repellent solid fluoropolymers are disclosed, comprising by weight:
  (a) 40–75% polymer chain units derived from a mixture of perfluoroalkylethylacrylate monomers of formula

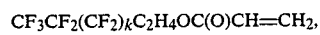

$CF_3CF_2(CF_2)_kC_2H_4OC(O)CH=CH_2$, the monomer mixture consisting essentially of:
  (1) 0–10% monomer wherein k is 4 or less;
  (2) 45–75% monomer wherein k is 6;
  (3) 20–40% monomer wherein k is 8;
  (4) 1–20% monomer wherein k is 10; and
  (5) 0–5% monomer wherein k is 12;
  (b) 10–35% polymer chain units derived from vinylidene chloride; and
  (c) 10–25% polymer chain units derived from an alkyl acrylate or alkyl methacrylate having an alkyl chain length of 2–18 carbons.

16 Claims, No Drawings

OIL- AND WATER-REPELLENT COPOLYMERS

CROSS REFERENCE TO A RELATED APPLICATION

This is a continuation-in-part of Application Ser. No. 824,355 filed Jan. 23, 1986, non abandoned.

BACKGROUND OF THE INVENTION

The present invention relates to polymer compositions for imparting oil- and water-repellency to textiles.

The patent literature discloses numerous fluoropolymer compositions having utility as textile treating agents. These fluoropolymers generally contain pendent perfluoroalkyl groups of three or more carbon atoms, which provide oil- and water-repellency when the compositions are applied to fabric surfaces. The perfluoroalkyl groups are attached by various connecting groups to polymerized vinyl groups, the latter being polymer chain units forming the backbone polymer chains. Methods for producing such polymers, either in aqueous emulsion or in solvent systems, are well known.

For example, Japanese published patent application No. 48-97274 (Asahi Glass Co.) discloses water-repellent and oil-repellent agents consisting of a copolymer containing at least 40 weight percent of a polymerizable compound containing perfluoroalkyl groups with 4-16 carbon atoms, and 10-60 weight percent vinylidene chloride. Japanese published patent application No. 50-54729 (Asahi Glass Co.) discloses an analogous composition for paper treatment, consisting of a copolymer containing at least 35 weight percent of a polymerizable compound containing perfluoroalkyl groups having 3-20 carbon atoms, 35-60 weight percent vinylidene chloride, and 0.5-5 weight percent N-methylol acrylamide or N-methylol methacrylamide.

Fabric treatment agents having improved repellency, durability, and substantivity are of significant interest to the textile and apparel industries.

SUMMARY OF THE INVENTION

The present invention provides an oil- and water-repellent solid fluoropolymer comprising by weight:
(a) 40–75% polymer chain units derived from a mixture of perfluoroalkylethylacrylate monomers of formula

$CF_3CF_2(CF_2)_kC_2H_4OC(O)CH=CH_2$, the monomer mixture consisting essentially of:
 (1) 0–10% monomer wherein k is 4 or less;
 (2) 45–75% monomer wherein k is 6;
 (3) 20–40% monomer wherein k is 8;
 (4) 1–20% monomer wherein k is 10; and
 (5) 0–5% monomer wherein k is 12;
(b) 10–35% polymer chain units derived from vinylidene chloride; and
(c) 10–25% polymer chain units derived from an alkyl acrylate or alkyl methacrylate having an alkyl chain length of 2-18 carbons.

DETAILS OF THE INVENTION

In its broadest aspect, the present invention provides copolymers of selected fluoroalkyl acrylate monomers, vinylidene chloride, and alkyl acrylates or alkyl methacrylates which exhibit enhanced water and oil repellency, drycleaning durability, and home wash durability when employed as fabric treatments.

The copolymers of this invention are prepared by conventional emulsion polymerization techniques. The aqueous polymer dispersions thereby produced can be applied to textile surfaces by known methods to impart oil-, soil-, and water-repellency. A distinquishing feature of the fluoropolymers of the present invention is their effectiveness at low application levels.

Perfluoroalkylethylacrylates of the formula $CF_3CF_2(CF_2)_kC_2H_4OC(O)CH=CH_2$, wherein k is an even integer from 2 to 14, are conventional and commercially available. They can be prepared by esterification of an appropriate perfluoroalkylethanol, $CF_3CF_2(CF_2)_kC_2H_4OH$, with acrylic acid, for example, as described in U. S. Pat. No.3,282,905. Preferably, the perfluoroalkyl group is linear, although compositions containing branched-chain perfluoroalkyl groups are suitable. Generally, such perfluoroalkylethylacrylates are supplied as a mixture of monomers of varying perfluoroalkyl chain length, typically from 4-14 carbons.

In accordance with the present invention, however, a perfluoroalkylethylacrylate mixture having a particular selection of alkyl chain lengths is employed. Referring to the formula set forth above, such mixtures consist essentially of 0–10 weight percent monomer wherein k is 4 or less; 45–75 weight percent monomer wherein k is 6; 20–40 weight percent monomer wherein k is 8; 1–20 weight percent monomer where k is 10; and 0–5 weight percent monomer wherein k is 12.

Preferred perfluoroalkylethylacrylate monomer mixtures are those consisting essentially of 0–8 weight percent monomer wherein k is 4 or less; 45–65 weight percent monomer wherein k is 6; 25–35 weight percent monomer wherein k is 8; 5–15 weight percent monomer wherein k is 10; and 0–5 weight percent monomer wherein k is 12.

The most preferred perfluoroalkylethylacrylate mixtures for use in the present invention are those consisting essentially of 0–6 weight percent monomer wherein k is 4 or less; 45–60 weight percent monomer wherein k is 6; 25–35 weight percent monomer wherein k is 8; 7–15 weight percent monomer wherein k is 10; and 0–3 weight percent monomer wherein k is 12.

The second required component of the fluoropolymer compositions of this invention is vinylidene chloride. The fluoropolymer compositions of the present invention contain 10–35 weight percent vinylidene chloride. Preferably, such compositions include 15–30 weight percent vinylidene chloride.

The third required monomer of the compositions of the present invention is one or a mixture of alkyl acrylates or alkyl methacrylates having alkyl chain lengths of 2 to 18 carbons, which are added to polymerization mixtures in proportions from 10 to 25 percent by weight. As used herein, "alkyl" refers to both linear, cyclic and branched-chain alkyl groups. Examples of such monomers include ethyl acrylate, propyl acrylate, butyl acrylate, cyclohexyl acrylate, isoamyl acrylate, isodecyl acrylate, isodecyl methacrylate, 2-ethylhexyl acrylate, octyl acrylate, lauryl acrylate, cetyl acrylate, stearyl methacrylate, and stearyl acrylate. Of the foregoing, 2-ethylhexyl acrylate, stearyl acrylate, stearyl methacrylate, and butyl acrylate are preferred, and stearyl acrylate and stearyl methacrylate are most preferred.

Finally, one or more specialized monomers can be incorporated into the copolymers of the present invention in lesser amounts, e.g., 0.1-5 percent by weight, to impart improved cross-linking, latex stability and substantivity. These materials include chlorohydroxypropyl methacrylate and chlorohydroxypropyl acrylate, which can be added in proportions equivalent to 0-5 percent by weight, e.g., 0.1 to 3 percent by weight; 0-5 percent by weight of one or more poly(oxyethylene)acrylates or methacrylates; N-methylol acrylamide or N-methylol methacrylamide, which can be added in proportions equivalent to 0.1-2 percent by weight or hydroxyethyl methacrylate or hydroxyethyl acrylate, which can be added in proportions equivalent to 0.1-2 percent by weight. Preferably, the latter monomers are added to provide polymer units equivalent to about 0.3-1.0 percent by weight.

A preferred class of compositions within the scope of the present invention includes fluoropolymers consisting essentially of, by weight, 45-70% polymer chain units derived from a perfluoroalkyl acrylate monomer as defined above; 15-30% polymer chain units derived from vinylidene chloride; 10-20% polymer chain units derived from an alkyl acrylate or alkyl methacrylate having an alkyl chain length of 2-18 carbons; 0.1-2% polymer chain units derived from N-methylol acrylamide or N-methylol methacrylamide, and optionally, up to 5% polymer chain units derived from chlorohydroxypropyl methacrylate or chlorohydroxypropyl acrylate, and up to 5% polymer chain units derived from poly(oxyethylene)acrylate or methacrylate.

Within each of the foregoing classes, subclasses of compositions are contemplated. A first contemplated subclass includes fluoropolymers wherein the alkyl acrylate or alkyl methacrylate component is an alkyl acrylate. A second subclass, which is preferred, includes fluoropolymers wherein this component is butyl acrylate, stearyl acrylate, stearyl methacrylate, or 2-ethylhexyl acrylate. A third contemplated subclass, including the most preferred compositions of the present invention, corresponds to those fluoropolymers wherein the alkyl acrylate or alkyl methacrylate component is stearyl acrylate or stearyl methacrylate.

In general, the copolymers of this invention can be prepared by known techniques for emulsion polymerization of vinyl compounds. The process can be carried out in a reaction vessel fitted with a stirrer and external means for either heating or cooling the charge. The monomers to be polymerized together are emulsified in an aqueous solution containing a suitable surfactant, and optionally an organic solvent, to provide an emulsion concentration of 5-50 percent. Usually the temperature is raised to about 40° C.-70° C. to effect polymerization in the presence of an added catalyst. A suitable catalyst can be any of the commonly known agents for initiating the polymerization of an ethylenically unsaturated compound. Such commonly employed initiators include 2,2'-azodi-isobutyramidine dihydrochloride, 2,2'-azodiisobutyro- nitrile, and 2,2'-azobis(2,4-dimethyl-4-methoxyvaleronitrile). The concentration of added initiator is usually 0.1-2 percent, based upon the weight of the monomers to be polymerized. The surfactant employed to stabilize the emulsion during its formation and during polymerization can be a cationic or non-ionic emulsifying agent or agents. Suitable cationic agents include, for example, dodecyltrimethylammonium acetate, trimethyltetradecylammonium chloride, hexadecyltrimethylammonium bromide, trimethyloctadecylammonium chloride, and others. Non-ionic agents which can be employed with good results include condensation products of ethylene oxide with 12-18 carbon atom fatty alcohols, 12-18 carbon atom fatty acids, alkylphenols having 12-18 carbon atoms in the alkyl group, 12-18 carbon atom alkanethiols, and 12-18 carbon atom alkyl amines. To control molecular weight of the resulting polymer, small amounts of a chain-transfer agent, such as an alkanethiol of 4-18 carbon atoms, can be present during polymerization.

The copolymers of this invention are obtained as aqueous dispersions. It is possible to isolate the polymer as a solid, if desired, by filtration, centrifugation, or evaporation of liquid carrier. However, for most purposes, the aqueous dispersions can be used directly for application to a textile or substrate to be rendered oil- and water-repellent. The copolymers of this invention can be applied alone or in admixture with diluent non-fluorinated polymers, or with other textile treatment agents or finishes.

The polymers of this invention are generally applied to textile fabrics as aqueous dispersions by spraying, dipping, padding, or other well-known methods. After excess liquid has been removed, for example, by squeeze rolls, the treated fabric is dried and then cured by heating, for example, to 140° C.-190° C., for at least 30 seconds, typically 60-180 seconds. Such curing enhances repellency and durability.

The following examples illustrate particular aspects of the present invention. In the examples, all percentages are by weight unless otherwise indicated, and all degrees are Celsius (° C.).

EXAMPLE 1

A water emulsion was prepared by agitating the following:

58.0 g perfluoroalkylethylacrylate
16.0 g stearylmethacrylate
5.0 g stearic acid/14-ethylene oxide adduct
0.5 g N,N-dimethyldodecylamine
0.5 g acetic acid
100.0 g water.

The perfluoroalkylethylacrylate component of the emulsion was a mixture of monomers characterized by the general formula $CF_3CF_2(CF_2)_kC_2H_4OC(O)CH=CH_2$, wherein k was 4, 6, 8, 10, and 12 in an approximate weight ratio of 6:51:29:9:2. The emulsion was added to a glass reaction vessel equipped with an agitator, a thermometer, and a dry-ice condenser, and containing 1.0 g N-methylolacrylamide
1.0 g hexadecylmercaptan
200.0 g water.

The resulting mixture was purged with nitrogen gas for one hour to remove substantially all air. The nitrogen purge was then switched to a positive pressure nitrogen blanket and 25.0 g vinylidene chloride were added. To initiate polymerization, 0.8 g azo bis isobutyramidine hydrochloride was added. The resulting mixture was then heated to 50° over one hour and held at 50° for 15 hours. The resulting polymer latex weighed 405 g and had a solids content of 26%.

EXAMPLE 2

A water emulsion was prepared by agitating the following:

59.0 g perfluoroalkylethylacrylate
16.0 g stearylmethacrylate
1.0 g stearic acid/14-ethylene oxide adduct
3.0 g lauryl alcohol/16-ethylene oxide adduct 50.0 g ethylene glycol
100.0 g water.

The perfluoroalkylethylacrylate component of the emulsion was a mixture of monomers characterized by the general formula $CF_3CF_2(CF_2)_kC_2H_4OC(O)CH=CH_2$, wherein k was 4, 6, 8, 10, and 12 in a approximate weight ratio of 6:51:29:9:2. The emulsion was added to a glass reaction vessel equipped with an agitator, a thermometer, and a dry-ice condenser, and containing 1.0 g N-methylolacrylamide
0.5 g hexadecylmercaptan
1.0 g hydroxyethylmethacrylate
2.0 g poly(oxyethylene)$_{20}$ methacrylate
70.0 g water.

The resulting mixture was purged with nitrogen gas for one hour to remove substantially all air. The nitrogen purge was then switched to a positive pressure nitrogen blanket and 25.0 g vinylidene chloride were added. To initiate polymerization, 1.0 g azo-bis-isobutyramidine hydrochloride was added. The resulting mixture was then heated to 50° over one hour and held at 50° for 15 hours. The resulting polymer latex weighed 329 g and had a solids content of 32%.

EXAMPLE 3

A water emulsion was prepared by agitating the following:

53.0 g perfluoroalkylethylacrylate
19.0 g 2-ethylhexylacrylate
5.0 g stearic acid/14-ethylene oxide adduct
0.5 g N,N-dimethyldodecylamine
0.5 g acetic acid
100.0 g water.

The perfluoroalkylacrylate monomer component of the emulsion was a mixture of monomers characterized by general formula $CF_3CF_2(CF_2)kC_2H_4OC(O)CH=CH_2$, wherein k is 6, 8, 10, and 12 in an approximate weight ratio of 66:26:6:2. The emulsion was added to a glass reaction vessel equipped with an agitator, a thermometer, and a dry-ice condenser, and containing 1.0 g N-methylolacrylamide
1.0 g hexadecylmercaptan
200.0 g water.

The resulting mixture was purged with nitrogen gas for one hour to remove substantially all air. The nitrogen purge was then switched to a positive pressure nitrogen blanket and 27.0 g vinylidene chloride was added. To initiate polymerization, 0.8 g azo-bis-isobutyramidine hydrochloride was added. The resulting mixture was then heated to 50° over one hour and held at 50° for 15 hours. The resulting polymer latex weighed 403 g and had a solids content of 23%.

EXAMPLES 4–8

In Examples 4–8, emulsion copolymers were prepared substantially according to the procedure of Example 3 to provide the compositions set forth in TABLE

TABLE I

| Monomer | Quantity in Emulsion (%) Example: | | | | |
|---|---|---|---|---|---|
|  | 4 | 5 | 6 | 7 | 8 |
| perfluoroalkylethylacrylate | 58 | 60 | 63 | 64 | 65 |
| 2-ethylhexyl acrylate | 0 | 0 | 16 | 17 | 16 |
| stearyl acrylate | 16 | 0 | 0 | 0 | 0 |
| butyl acrylate | 0 | 17 | 0 | 0 | 0 |
| vinylidene chloride | 25 | 22 | 20 | 18 | 19 |
| N—methylolacrylamide | 1.0 | 1.0 | 1.0 | 1.0 | 1.0 |

Repellency and Durability Testing

1. Fabric Treatment

A portion of the polymer dispersion was diluted with water to a polymer content of 1–2%, then applied to nylon fabric by padding to provide a fluorine level of 1200 ppm on the fabric surface. The resulting treated fabric was then dried at 180° for 30 seconds. Fabrics selected for treatment included two medium-weight nylon fabrics, herein designated "blue nylon" and "gray nylon", and a durable, water repellent heavyweight nylon fabric (Cordura ®). These fabrics were contaminated with residual dyeing auxiliaries.

2. Water Repellency

The treated fabric samples were tested for water repellency using AATCC standard Test Method No. 22 of the American Association of Textile Chemists and Colorists. In this test, 250 mL of water at 27° is poured in a narrow stream onto a fabric sample stretched on a 6-inch (15.2 cm) diameter metal hoop. The water is discharged from a funnel suspended six inches (15.2 cm) above the fabric sample. After removal of excess water, the fabric is visually scored by reference to published standards. A rating of 100 denotes no water penetration or surface adhesion; a rating of 90 denotes slight random sticking or wetting; lower values indicate greater wetting.

3. Oil Repellency

Treated fabric samples were tested for oil repellency by a modification of AATCC Standard Test Method No. 118, conducted as follows. A fabric sample, treated with an aqueous dispersion of polymer as previously described, is conditioned for a minimum of 2 hours at 23±2° and 65±10% relative humidity. A series of organic liquids, identified below in TABLE II, are then applied dropwise to the fabric samples. Beginning with the lowest numbered test liquid, (Repellency Rating No. 1) one drop (approximately 5 mm in diameter or 0.05 mL volume) is placed on each of three locations at least 5 mm apart. The drops are observed for 30 seconds. If, at the end of this period, two of the three drops are still spherical to hemispherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the fabric is the highest numbered test liquid for which two of three drops remain spherical to hemispherical, with no wicking for 30 seconds. In general, treated textiles with a rating of 5 or greater are good or excellent; textiles having a rating of one or greater can be used for certain applications.

TABLE II

| Oil Repellency Rating Number | Test Solution |
|---|---|
| 1 | Nujol Purified Mineral Oil |
| 2 | 65/35 Nujol/n-hexadecane by volume at 21°. |
| 3 | n-hexadecane |
| 4 | n-tetradecane |
| 5 | n-dodecane |
| 6 | n-decane |

Note:
Nujol is a trademark of Plough, Inc., for a mineral oil having a Saybolt viscosity of 360/390 at 38° and a specific gravity of 0.880/0.900 at 15°.

4. Home Wash Durability

Durability of fluoropolymer repellency treatments was estimated by a nylon fabric home wash durability test representing a modification of AATCC Standard Test Method No. 130. In this test, fabrics treated with polymer dispersions and then conditioned as previously described are first sampled for fluorine content, then cured at elevated temperature and washed. In a typical procedure, a 4 lb. load (1.8 kg) with 28 g detergent (Tide) is washed in a home washer for a 12-minute cycle, at a temperature of 60±3°, followed by a cold rinse. Fabric specimens are then tumble-dried at 71±9° for 40 minutes. The foregoing procedure constitutes one Home Wash Cycle. After one or more such cycles, fabric specimens are conditioned and tested for oil- and water-repellency.

5. Drycleaning Fastness

A nylon fabric drycleaning fastness test was also employed to evaluate the durability of polymer treatments. This test is carried out in a motor-driven tumble-jar apparatus conforming to the requirements of Method 5500 of Federal Specification CCC-T191b and AATCC Standard Test Method No. 70. In this test, 75–175 g fabric are loaded into the tumble jar, and 10 mL perchloroethylene are added per gram fabric. The jar is then sealed and the apparatus operated for 20 minutes at about 23°. The fabric is then removed from the jar, centrifuged to remove excess cleaning fluid, and dried at about 23° or for five minutes at about 71° in a steam-heated tumble dryer. Each sample is then pressed for 15 seconds on each side using a flat-bed press at 138–160°.

The results obtained by testing of fabric treatments employing the fluoropolymer compositions of Examples 1–8 are set forth in the following tables. For comparative purposes, the performance of a representative commercial fluoropolymer treatment composition is also indicated. The latter product, herein designated "Comparison A," consists essentially of an emulsion copolyme of 75% perfluoroalkyl methacrylate monomer (having the composition previously described) and 25% 2-ethylhexyl acrylate.

In the following tables, water repellency ratings are indicated first, followed by oil repellency ratings. For each treatment composition, repellency evaluations were undertaken following application (Initial), following one simulated dry-cleaning exposure as described above, and following five simulated home-washing procedures as described above.

TABLE III
Repellency and Durability of Fluoropolymer Treatments on Blue Nylon Fabric

| Example or Comparison | Initial | After One Dry Cleaning | After Five Home Washings |
|---|---|---|---|
| 1 | 100/5 | 100/4 | 90/3 |
| 2 | 100/4 | 90+/3 | 70/1 |
| 3 | 90/5 | 90+/5 | 90/3 |
| 4 | 100/5 | 90/4 | 90/4 |
| 5 | 100/5 | 90/2 | 70/2 |
| 6 | 100/6 | 90/2 | 70/2 |
| 7 | 80/5 | 90/2 | 50+/1 |
| 8 | 80+/4 | 90/2 | 70/0 |
| A | 50/3 | 80+/3 | 50/2 |

TABLE IV
Repellency and Durability of Fluoropolymer Treatments on Gray Nylon Fabric

| Example or Comparison | Initial | After One Dry Cleaning | After Five Home Washings |
|---|---|---|---|
| 1 | 90/5 | 100/4 | 50+/2 |
| 2 | 80/4 | 90+/2 | 50/0 |
| 3 | 100/5 | 100/5 | 80+/4 |
| 4 | 100/4 | 90/5 | 50+/2 |
| 5 | 70/4 | 80/4 | 50/0 |
| 6 | 50+/4 | 80/4 | 50/0 |
| 7 | 50/3 | 80/3 | 0/0 |
| 8 | 50+/3 | 80/3 | 50+/0 |
| A | 50/3 | 70/2 | 0/0 |

TABLE V
Repellency and Durability of Fluoropolymer Treatments on Durable Heavyweight Nylon Fabric

| Example or Comparison | Initial Repellency |
|---|---|
| 1 | 100/4 |
| 2 | 90/4 |
| 3 | 80+/3 |
| 4 | 100/4 |
| 5 | 90/5 |
| 6 | 90/4 |
| 7 | 90/5 |
| 8 | 90/4 |
| A | 80+/4 |

What is claimed is:

1. An oil- and water-repellent solid fluoropolymer comprising by weight:
   (a) 40–75% polymer chain units derived from a mixture of perfluoroalkylethylacrylate monomers of formula

   $$CF_3CF_2(CF_2)_kC_2H_4OC(O)CH=CH_2,$$

the monomer mixture consisting essentially of:
   (1) 0–10% monomer wherein k is 4 or less;
   (2) 45–75% monomer wherein k is 6;
   (3) 20–40% monomer wherein k is 8;
   (4) 1–20% monomer wherein k is 10; and
   (5) 0–5% monomer wherein k is 12;
   (b) 10–35% polymer chain units derived from vinylidene chloride;
   (c) 10–25% polymer chain units derived from an alkyl acrylate or alkyl methacrylate having an alkyl chain length of 2–18 carbon atoms; and
   (d) 0–5% polymer chain units derived from chlorohydroxypropylacrylate or chlorohydroxypropylmethacrylate.

2. A fluoropolymer according to claim 1, additionally comprising by weight:

(e) 0.1–2% polymer chain units derived from N-methylolacrylamide or N-mehylolmethacrylamide; and (f) 0.1–2% polymer chain units derived from hydroxyethylmethacrylate or hydroxyethylacrylate.

3. A fluoropolymer according to claim 2, consisting essentially of, by weight:

(a) 45–70% polymer chain units derived from a mixture of perfluoroalkylethylacrylate monomers of formula $$CF_3CF_2(CF_2)_kC_2H_4OC(O)CH=CH_2,$$

the monomer mixture consisting essentially of:
(1) 0–10% monomer wherein k is 4 or less;
(2) 45–75% monomer wherein K is 6;
(3) 20–40% monomer wherein K is 8;
(4) 1–20% monomer wherein k is 10; and
(5) 0–5% monomer wherein k is 12;

(b) 15–30% polymer chain units derived from vinylidene chloride;

(c) 10–20% polymer chaing units derived from an alkyl acrylate or alkyl methacrylate having an alkyl chain length of 2–18 carbons;

(d) 0–5% polymer chain units derived from chlorohydroxypropylacrylate or chlorohydroxypropylmethacrylate;

(e) 0.1–2% polymer chain units derived from N-methylolacrylamide or N-methylolmethacrylamide;

(f) 0.1–2% polymer chain units derived from hydroxyethylmethacrylate or hydroxyethylacrylate; and (g) 0–5% polymer chain units derived from Poly(oxyethylene)acrylate or methacrylate.

4. A fluorpolymer according to claim 3, wherein the alkyl acrylate or alkyl methacrylate is butylacrylate, stearylacrylate, stearylmethacrylate, or 2-ethylhexylacrylate.

5. A fluoropolymer according to claim 4, wherein the alkyl acrylate is 2-ethylhexylacrylate.

6. A fluoropolymer according to claim 4, wherein the alkyl acrylate or alkyl methacrylate is stearylacrylate or stearylmethacrylate.

7. A fluoropolymer according to claim 1, consisting essentially of, by weight:

(a) 40–75% polymer chain units derived from a mixture of perfluoroalkylethylacrylate monomers of formula $$CF_3CF_2(CF_2)_kC_2H_4OH(O)CH=CH_2,$$

the monomer mixture consisting essentially of:
(1) 0–8% monomer wherein k is 4 or less;
(2) 45–65% monomer wherein k is 6;
(3) 25–35% monomer wherein k is 8;
(4) 5–15% monomer wherein k is 10; and
(5) 0–5% monomer wherein k is 12;

(b) 10–35% polymer chain unts derived from vinylidene chloride;

(c) 10–25% polymer chain units derived from an alkyl acrylate or alkyl methacrylate having an alkyl chain length of 2–18 carbons;

(d) 0–5% polymer chain units derived from chlorohydroxypropylacrylate or chlorohydroxypropylmethacrylate;

(e) 0.1–2% polymer chain units derived from N-methylolacrylamide or N-methylolmethacrylamide;

(f) 0.1–2% polymer chain units derived from hydroxyethylmethacrylate or hydroxyethylacrylate; and (g) 0.5% polymer chain units derived from poly(oxyethylene) acrylate or methacrylate.

8. A fluropolymer according to claim 7, consisting essentially of, by weight:

(a) 40–75% polymer chain units derived from a mixture of perfluoroalkylethylacrylate monomers of formula $$CF_3CF_2(CF_2)_kC_2H_4OH(O)CH=CH_2,$$

the monomer mixture consisting essentially of:
(1) 0–6% monomer wherein k is 4 or less;
(2) 45–60% monomer wherein k is 6;
(3) 25–35% monomer wherein k is 8;
(4) 7–15% monomer wherein k is 10; and
(5) 0–3% monomer wherein in k is 12;

(b) 10–35% polymer chain units derived from vinylidene chloride;

(c) 10–25% polymer chain units derived from an alkyl acrylate or alkyl methacryalte having an alkyl chain length of 2–18 carbons;

(d) 0–5% polymer chain units derived from chlorohydroxypropylacrylate or or chorohydroxypropylmethacrylate;

(e) 0.1–2 % polymer chain units derived from N-methylolacrylamide or N-methylolmethacrylamide;

(f) 0.1–2% polymer chain units derived from hydroxyethylmethacrylate or hydroxyethylacrylate; and (g) 0–5% polymer chain units derived from poly(oxyethylene) acrylate or methacrylate.

9. A fluoropolymer according to claim 8, wherein the alkyl acrylate or alkyl methacrylate is butylacrylate, stearylacrylate, stearylmethacrylate, or 2-ethylhexylacrylate.

10. A fluoropolymer according to claim 9, wherein the alkyl acrylate is 2-ethylhexylacrylate.

11. A fluoropolymer aCording to claim 9, wherein the alkyl acrylate or alkyl methacrylate is stearylacrylate or stearylmethacrylate.

12. A fluoropolymer according to claim 7, consisting essentially of, by weight:

(a) 45–70% polymer chain units derived from a mixture of perfluoroalkylethylacrylate monomers of formula $$CF_3CF_2(CF_2)_kC_2H_4OC(O)CH=CH_2,$$

the monomer mixture consisting essentially of
(1) 0–8% monomer wherein k is 4 or less;
(2) 45–65% monomer wherein k is 6;
(3) 25–35% monomer wherein k is 8;
(4) 5–15% monomer wherein k is 10; and
(5) 0–5% monomer wherein k is 12;

(b) 15–30% polymer chain units derived from vinylidene chloride;

(c) 10–20% polymer chain units derived from an alkyl acrylate or alkyl methacrylate having an alkyl chain length of 2–18 carbons;

(d) 0.5% polymer chain units derived from chlorohydroxypropylacrylate or chlorohydroxypropylmethacrylate;

(e) 0.1–2% polymer chain units derived from N-methylolacrylamide or N-methylolmethacrylamide;

(f) 0.1-2% polymer chain units derived from hydroxyethylmethacrylate or hydroxyethylacrylate; and (g) 0-5% polymer chain units derived from poly(oxyethylene)acrylate or methacrylate.

13. A fluoropolymer according to claim 12, consisting essentially of, by weight:

(a) 45-70% polymer chain units derived from a mixture of perfluoroalkylethylacrylate monomers of formula $$CF_3CF_2(CF_2)_k C_2H_4OC(O)CH=CH_2,$$

the monomer mixture consisting essentially of:
(1) 0-6% monomer wherein k is 4 or less;
(2) 45-60% monomr wherein k is 6;
(3) 25-35% monomer wherein k is 8;
(4) 7-15% monomer wherein k is 10; and
(5) 0-3% monomer wherein k is 12;

(b) 15-30% polymer chain units derived from vinylidene chloride;

(c) 10-20% polymer chain units derived from an alkyl acrylate or alkyl methacrylate having an alkyl chain length of 2-18 carbons;

(d) 0.5% polymer chain units derived from chlorohydroxypropylacrylate or chlorohydroxypropylemthacrylate;

(e) 0.1-2% polymer chain units derived from N-methylolacrylamide or N-methylolmethacrylamide; and (f) 0.1-2% polymer chain units derived from hydroxyethylemthacrylate or hydroxyethylacrylate.

14. A fluoropolymer according to claim 13, wherein the alkyl acrylate or alkyl methacrylate is butylacrylate, stearylacrylate, stearylmethacrylate, or 2-ethylhexyl acrylate.

15. A fluoropolymer according to claim 14, wherein the alkyl acrylate is 2-ethylhexylacrylate.

16. A fluoropolymer according to claim 14, wherein the alkyl acrylate or alkyl methacrylate is stearylacrylate of stearylmethacrylate.

* * * * *